United States Patent
De Avila Antonini et al.

(10) Patent No.: US 11,268,435 B2
(45) Date of Patent: Mar. 8, 2022

(54) STRUCTURAL ARRANGEMENT IN A LOW-TEMPERATURE TURBOCOMPRESSOR FOR AN INTERNAL COMBUSTION ENGINE

(71) Applicant: Duo Engenharia Criativa Ltda, Porto Alegre (BR)

(72) Inventors: Natal De Avila Antonini, Porto Alegre (BR); André Schaan Casagrande, Porto Alegre (BR); Bruno Hartmann Da Silva, Porto Alegre (BR); Eduardo Donadel Basso, Porto Alegre (BR); Vitor Tumelero Valente, Porto Alegre (BR)

(73) Assignee: Duo Engenharia Criativa Ltda, Rua Joao (BR)

( * ) Notice: Subject to any disclaimer, the term of this patent is extended or adjusted under 35 U.S.C. 154(b) by 0 days.

(21) Appl. No.: 16/762,797

(22) PCT Filed: May 21, 2018

(86) PCT No.: PCT/BR2018/050168
§ 371 (c)(1),
(2) Date: May 8, 2020

(87) PCT Pub. No.: WO2019/006527
PCT Pub. Date: Jan. 10, 2019

(65) Prior Publication Data
US 2021/0270181 A1    Sep. 2, 2021

(30) Foreign Application Priority Data
Jul. 5, 2017    (BR) .................. 10 2017 014513 1

(51) Int. Cl.
*F02B 37/013*    (2006.01)
*F02B 29/04*    (2006.01)
(Continued)

(52) U.S. Cl.
CPC ........ *F02B 37/013* (2013.01); *F02B 29/0412* (2013.01); *F02B 37/004* (2013.01);
(Continued)

(58) Field of Classification Search
CPC ...... F02B 37/013; F02B 37/16; F02B 37/164; F02B 37/004; F02B 37/10; F02B 39/04; F02B 39/085
(Continued)

(56) References Cited

U.S. PATENT DOCUMENTS 2,298,625 A    10/1942    Larrecq
2,392,622 A *  1/1946    Traupel .................. F02C 9/32
                                              60/39.281
(Continued)

FOREIGN PATENT DOCUMENTS

DE    102009031845 A1    1/2011
EP         0655550 A1    5/1995
(Continued)

OTHER PUBLICATIONS

European Paient Office; Extended European Search Report for Application No. 18827483.1; dated Feb. 22, 2021, 5 pages.
(Continued)

*Primary Examiner* — Thai Ba Trieu
(74) *Attorney, Agent, or Firm* — Greensfelder, Hemker & Gale, P.C.

(57) ABSTRACT

A low-temperature turbocompressor structural arrangement for an internal combustion engine for using energy that is available but unused during operation to cool the air supplied to the engine by supercharging. The temperature of the air compressed by the compressor is reduced by a cooling system and the air is then conveyed to a further turbine actuated by the intake air flow of the engine. The structural (Continued)

Figure 1:
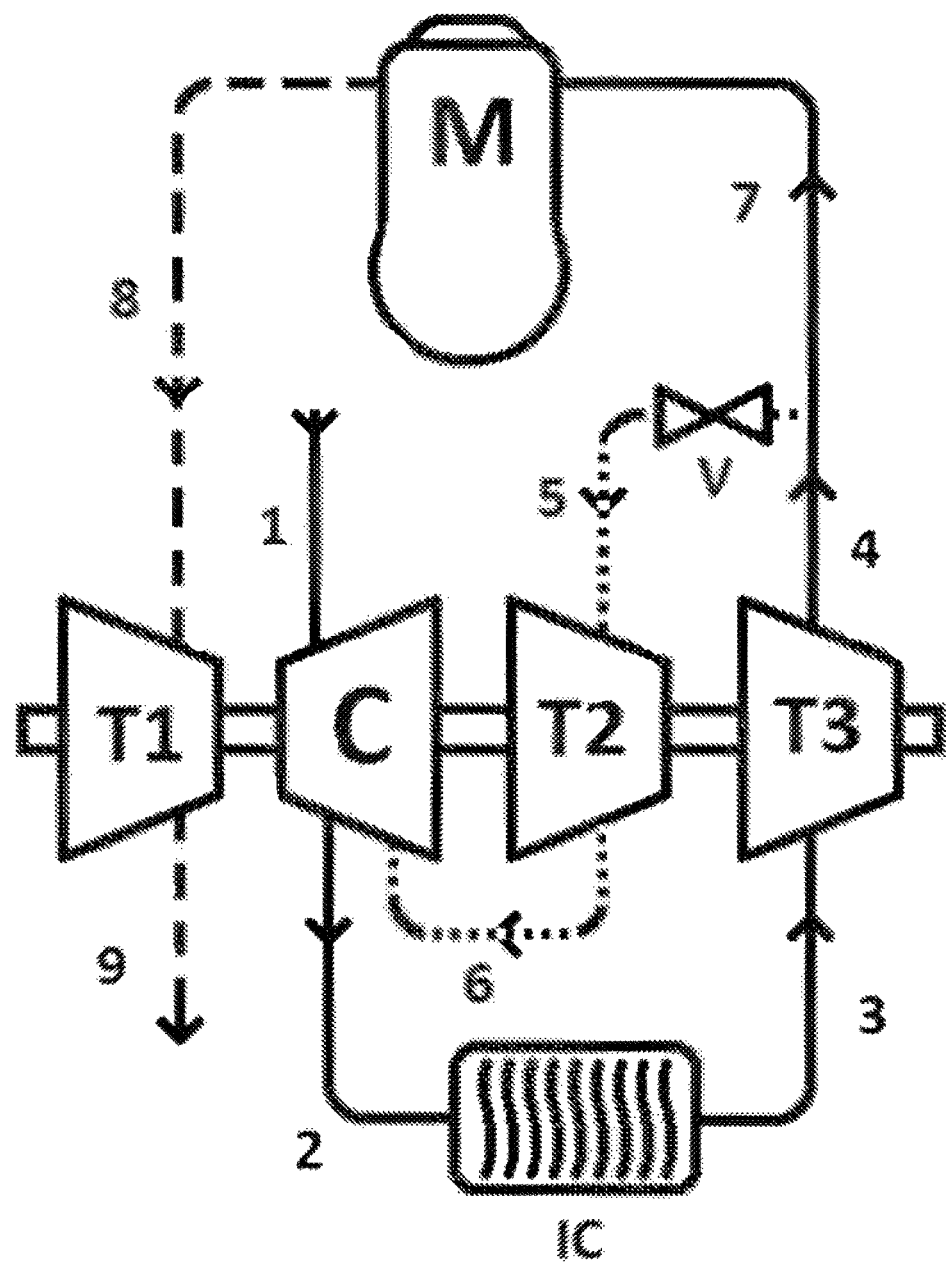

arrangement may be mounted in full or in part, and also each component may be fitted into existing systems.

23 Claims, 9 Drawing Sheets

(51) Int. Cl.
  *F02B 37/00* (2006.01)
  *F02B 37/10* (2006.01)
  *F02B 39/04* (2006.01)
  *F02B 39/08* (2006.01)

(52) U.S. Cl.
  CPC .............. *F02B 37/10* (2013.01); *F02B 39/04* (2013.01); *F02B 39/085* (2013.01)

(58) Field of Classification Search
  USPC ................................................ 60/605.1, 611
  See application file for complete search history.

(56) References Cited

U.S. PATENT DOCUMENTS

| | | | |
|---|---|---|---|
| 2,703,561 A | | 3/1955 | Froehlich |
| 3,355,877 A | | 12/1967 | Chaffiotte |
| 4,010,613 A | | 3/1977 | McInerney |
| 4,062,188 A | | 12/1977 | Cutler et al. |
| 4,885,911 A | | 12/1989 | Woollenweber et al. |
| 5,259,196 A | | 11/1993 | Faulkner et al. |
| 5,269,143 A | | 12/1993 | Cikanek et al. |
| 5,442,904 A | * | 8/1995 | Shnaid ...................... F02C 6/18 60/39.183 |
| 5,577,385 A | * | 11/1996 | Kapich ................. F02B 37/164 60/612 |
| 5,904,045 A | * | 5/1999 | Kapich ................. F02B 37/164 60/609 |
| 6,158,217 A | | 12/2000 | Wang |
| 8,176,736 B2 | | 5/2012 | Janssen |
| 8,726,657 B2 | | 5/2014 | Hunter |
| 8,943,823 B2 | | 2/2015 | Fiveland |
| 9,115,639 B2 | | 8/2015 | Petrovic et al. |
| 9,115,644 B2 | | 8/2015 | Bauer et al. |
| 9,243,548 B2 | | 1/2016 | Klingbeil et al. |
| 9,347,365 B2 | | 5/2016 | Hunter |
| 9,464,638 B2 | | 10/2016 | Cepeda-Rizo et al. |
| 10,006,346 B2 | | 6/2018 | Kemmerling et al. |
| 10,794,266 B2 | | 10/2020 | Rodriguez Erdmenger et al. |
| 2005/0198957 A1 | | 9/2005 | Kim |
| 2007/0033939 A1 | | 2/2007 | Wang et al. |
| 2009/0235661 A1 | | 9/2009 | Janssen |
| 2012/0210952 A1 | | 8/2012 | Reuss et al. |
| 2013/0008161 A1 | * | 1/2013 | Flohr .................... F02B 37/001 60/600 |
| 2014/0157774 A1 | * | 6/2014 | McConville .......... F02B 37/164 60/611 |
| 2019/0301352 A1 | | 10/2019 | Whelan et al. |
| 2021/0115840 A1 | | 4/2021 | Michels |

FOREIGN PATENT DOCUMENTS

| | | |
|---|---|---|
| EP | 3680466 A1 | 7/2020 |
| GB | 2129055 A | 10/1984 |
| WO | 2017171793 A1 | 10/2017 |

OTHER PUBLICATIONS

Instituto Nacional Da Propriedade Industrial, International Search Report for PCT/BR2018/050168 with English translation, dated Sep. 5, 2018, 6 pages.
Instituto Nacional Da Propriedade Industrial, Written Opinion of the International for PCT/BR2018/050168 with English translation, dated Sep. 5, 2018, 9 pages.
The International Bureau of WIPO, International Preliminary Report on Patentability for PCT/BR2018/050168 with English translation, dated Jan. 7, 2020, 11 pages.

* cited by examiner

STRUCTURAL ARRANGEMENT IN A LOW-TEMPERATURE TURBOCOMPRESSOR FOR AN INTERNAL COMBUSTION ENGINE

CROSS-REFERENCE TO RELATED APPLICATIONS

The present application is a U.S. national stage filing of International Application No. PCT/BR2018/050168 filed May 21, 2018, which claims priority from and the benefit of Brazilian Application No. BR 10 2017 014513 1 filed Jul. 5, 2017, the contents of which are incorporated here by reference and made a part hereof.

The present invention relates to a structural arrangement in a low-temperature turbocompressor for an internal combustion engine, which is a system for using the energy that is available but unused during operation of an internal combustion engine for cooling the air supplied to the engine by supercharging.

SCOPE

The present structural arrangement in a low-temperature turbocompressor for an internal combustion engine can be used in any type of internal-combustion engine.

PRIOR ART AND PROBLEM

The prior art, and the reason for this patent, is the premise that both the torque and the efficiency of an engine are related to the mass of air that the engine can aspirate per intake cycle. Compressing the air before intake thereof into the engine increases the mass of air admitted into the cylinder, and consequently the fuel injection, thereby increasing the torque and therefore the power of the engine. This effect helps to reduce the size of a turbocharged engine in relation to a naturally aspirated engine, saving fuel and reducing mass and volume for the same power. The most common types of supercharging are mechanical compression and turbocompression. While mechanical compressors use some of the torque to increase the mass of air admitted by the engine, turbocompressors have the advantage of using energy that would otherwise be discharged into the environment through the exhaust pipe to achieve the same effect. A turbocompression system is formed by a turbine that uses the exhaust gases from the engine and that is rigidly connected to a compressor that compresses the air into the engine. However, the energy supplied to the turbine is sometimes greater than necessary, and pressure adjustment systems are required to ensure that the engine is only supplied with the necessary air, and at a safe pressure.

Both types of compressor are regulated by relief valves to work up to a pressure limit so as not to damage the engines to which the supercharging is applied. The adjustment system most commonly used in turbocompressors is a wastegate valve, which enables a portion of the exhaust gas to not pass through the turbine, thereby not increasing the energy transferred to the compressor. A pop-off valve can also be used, including in mechanical compressors, to eliminate the excess pressure in the system after the compressor by causing a sort of leak in the system when a predetermined pressure is reached. Another problem with compression is the consequent increase in the temperature of the air resulting in a reduction in density and an increase in the risk of abnormal combustion within the cylinders. To avoid these problems, vehicles that use this type of compression have to keep the compression within a safety limit, provide means for reducing the ignition advance, or use fuel of a higher octane than normal.

The devices used to minimize pinking are called intermediate coolers, or intercoolers. The intercooler is a heat exchanger used to reduce the temperature of the compressed air, increasing the density thereof and reducing the risk of abnormal combustion. Nonetheless, the inlet temperature remains high in relation to the ambient air, which is prejudicial for internal-combustion engines, in particular spark-ignition engines, which operate more efficiently at lower inlet temperatures. The issue is so important for internal-combustion engines that other devices are used in addition to the intercooler to reduce the risk of abnormal combustion, such as increasing the quantity of fuel in the mixture, injecting water along with the fuel or even, in the most extreme cases, using ice or cooling gas sprays along with the intercooler.

No references identical to the subject matter being proposed have been found in the patents of the Brazilian National Institute of Industrial Property (INPI). Patent PI 0412575-4 relates to the cooling of charge air with a secondary cooling circuit that can be liquid, since the problem of boiling is mentioned, and not recirculation of the intake gas itself, with turbines and compressors not connected in the same system, as in a conventional two-stage system.

Patents BR 102014010250-7 and PI 0603300-4 relate to the recirculation of exhaust gas, while the TCBT recirculates the fresh intake air.

Patent PI 1100859-8 has an adjustment valve at the intake of the engine, and does not have a turbine in the return. The adjustment and relief valves are also separated and there is no reference to the return from the relief to the compressor.

INVENTIVE CONCEPT

In view of this problem, the present structural arrangement in a low-temperature turbocompressor for an internal combustion engine incorporates the following innovations and functions:

The present structural arrangement in a low-temperature turbocompressor for an internal combustion engine incorporates the concept of supercharging of the internal-combustion engine by the compressor with pressures up to the maximum limit of the latter, unlike the usual arrangement in which the pressure inside the system is kept practically constant by adjustment systems, from the outlet of the compressor to the inlet valves of the engine. The temperature of the air compressed by the compressor is reduced by a cooling system and is then conveyed to a further turbine driven by the flow of intake air of the engine. The main innovation of the structural arrangement in a low-temperature turbocompressor for an internal combustion engine described herein is to supply the engine with air that is colder and therefore denser than a common turbocompressor, and to do so using the same amount of energy as consumed by the latter. The benefits resulting from this are enhanced engine performance levels, which may be used in order to obtain greater power or reduce consumption, since the denser air contains more oxygen and allows more fuel into the combustion chamber at the same pressure, achieving a larger explosion, which increases the power-to-weight ratio, and the cooler air allows work at more aggressive compression ratios and/or ignition advances without problems of pre-ignition/pinking, thereby enhancing engine performance.

The present structural arrangement in a low-temperature turbocompressor for an internal combustion engine can be installed fully or partially, as required or to order.

Each component of the present structural arrangement in a low-temperature turbocompressor for an internal combustion engine can be adapted to preexisting systems.

Advantages

The advantages of the structural arrangement in a low-temperature turbocompressor for an internal combustion engine are as follows:

It enables the engine to be supplied with air that is colder and therefore denser than a common turbocompressor, using the same amount of energy as consumed by this latter.

It enables more fuel to be conveyed to the combustion chamber and enables a larger explosion, which increases the power-to-weight ratio.

It enables the engine to operate with higher compression ratios and/or greater ignition advance without causing problems of abnormal combustion, which increases the performance of the engine.

The turbocompressor only connects to the cooled-air turbine system once the turbines have started to generate power for the system.

DRAWINGS

In order to facilitate the search and understanding of the present patent, as recommended in the report, according to a basic and preferred embodiment created by the applicant, reference is made to the attached drawing, which supplements and supports the present description, in which:

FIG. 1—Schematic view of the structural arrangement in a low-temperature turbocompressor for an internal combustion engine with just one compression stage.

Figure 2:
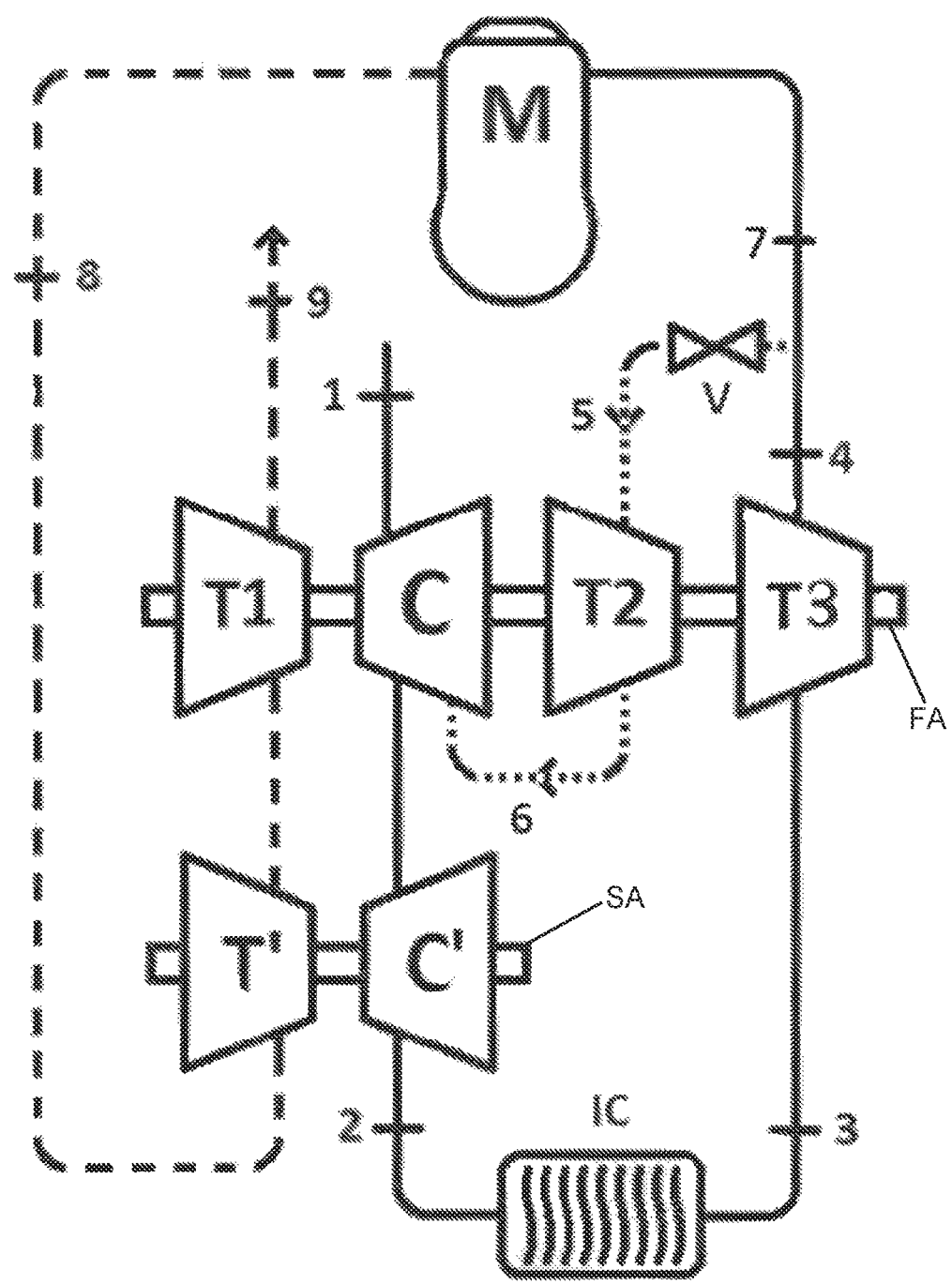

FIG. 2—Schematic view of the structural arrangement in a low-temperature turbocompressor for an internal combustion engine assembled in a first axle with an additional turbocompressor arranged in series assembled in a second axle.

Figure 3:
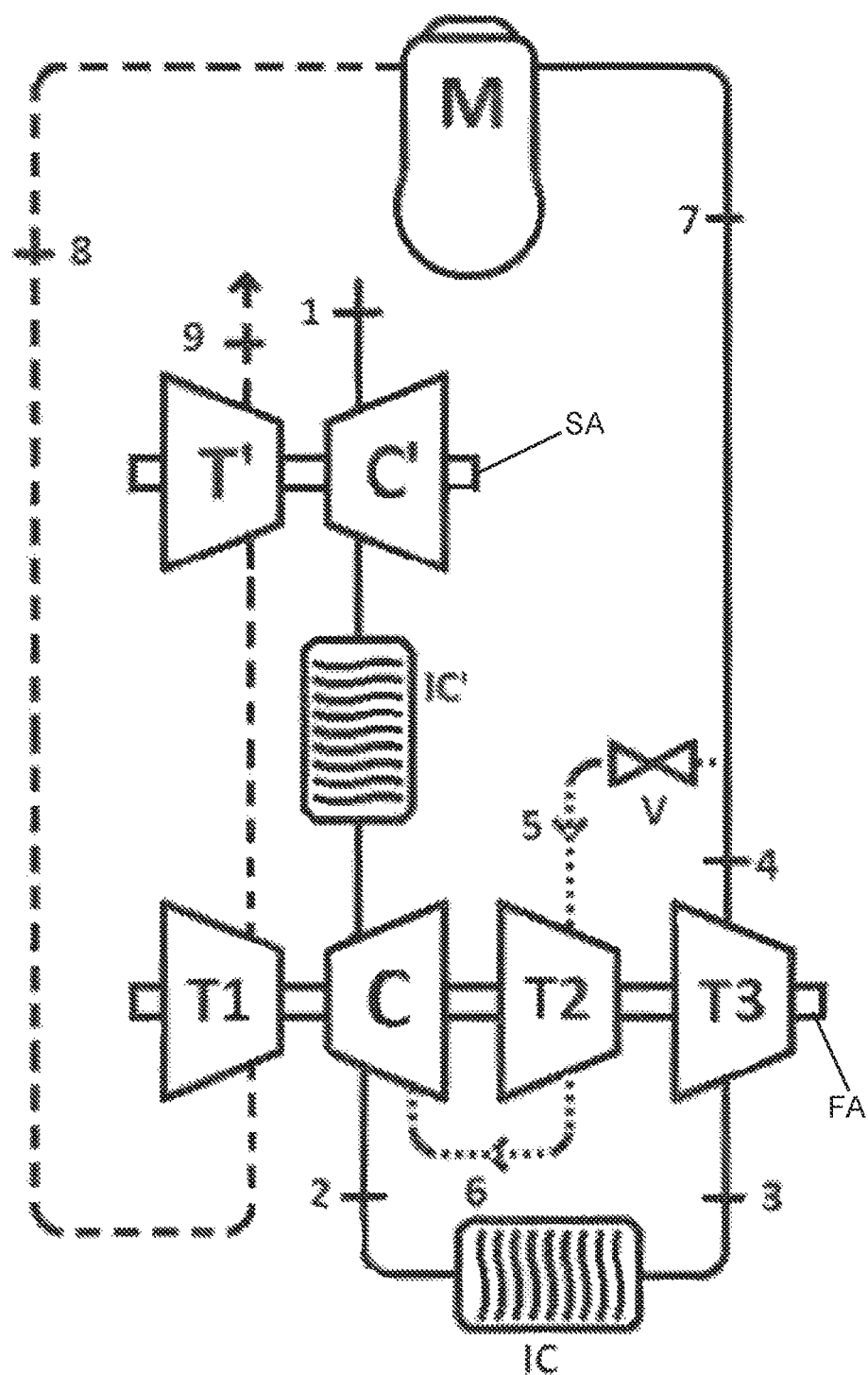

FIG. 3—Schematic view of the structural arrangement in a low-temperature turbocompressor for an internal combustion engine assembled in a first axle with an additional low-pressure turbocompressor arranged in series assembled in a second axle and an additional intercooler.

Figure 4:
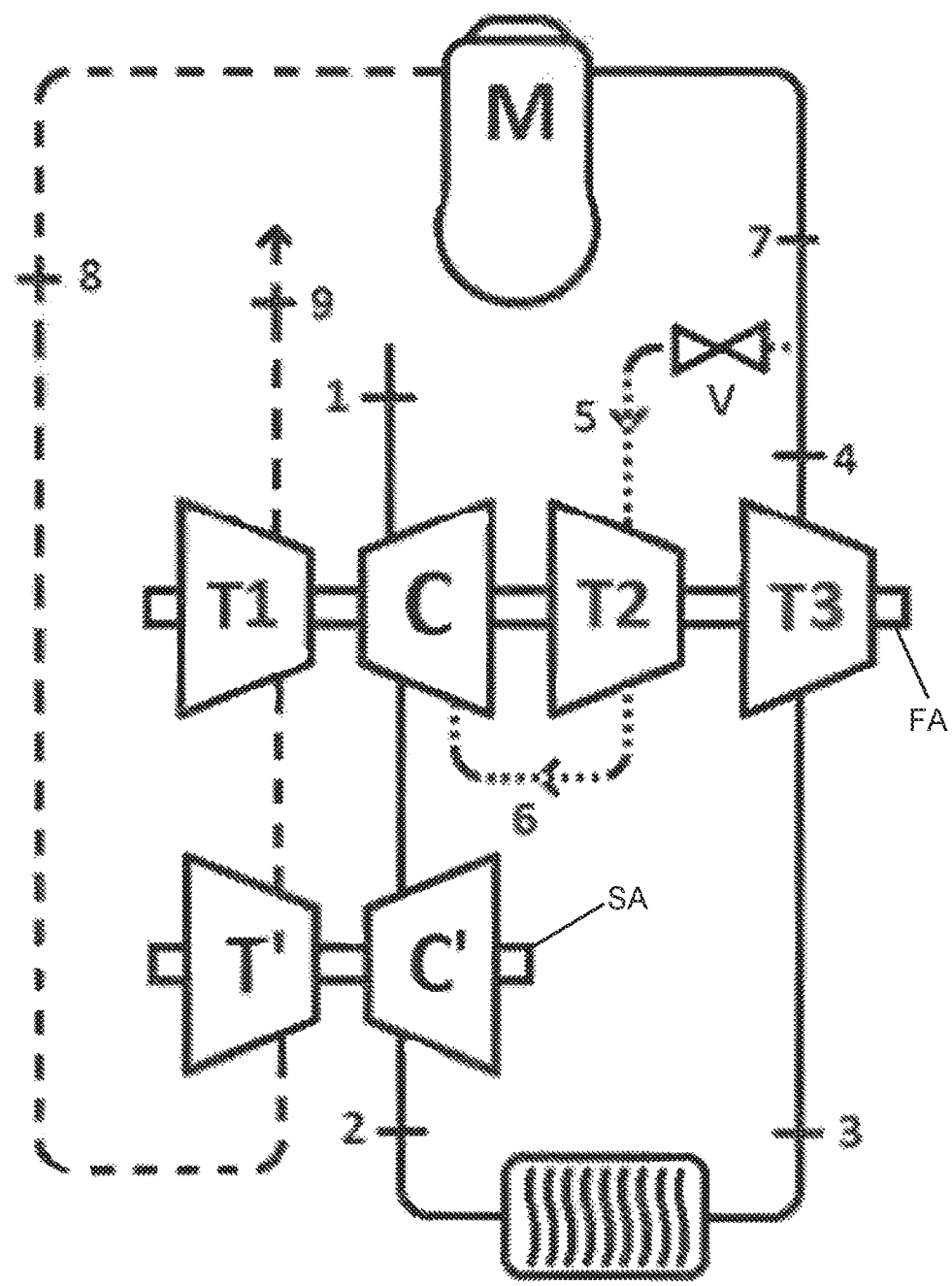

FIG. 4—Schematic view of the structural arrangement in a low-temperature turbocompressor for an internal combustion engine assembled in a first axle with an additional high-pressure turbocompressor arranged in series assembled in a second axle.

Figure 5:
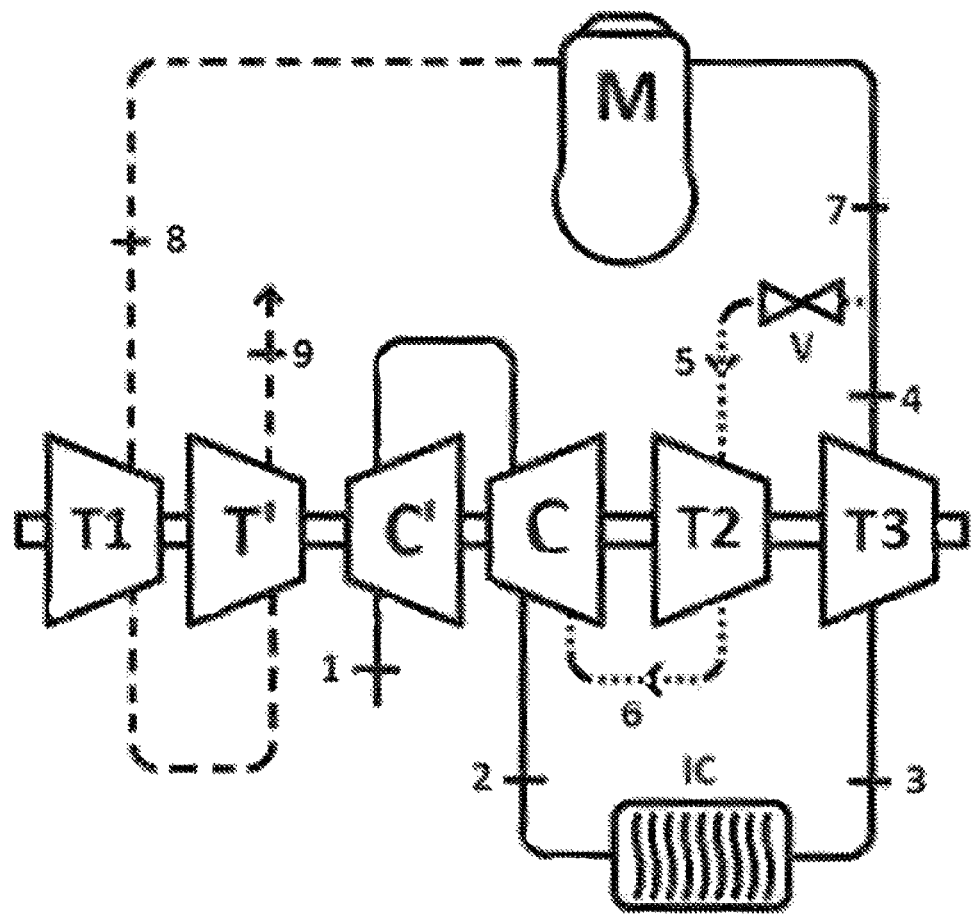

FIG. 5—Schematic view of the structural arrangement in a low-temperature turbocompressor for an internal combustion engine with an additional low-pressure turbocompressor on the same shaft.

Figure 6:
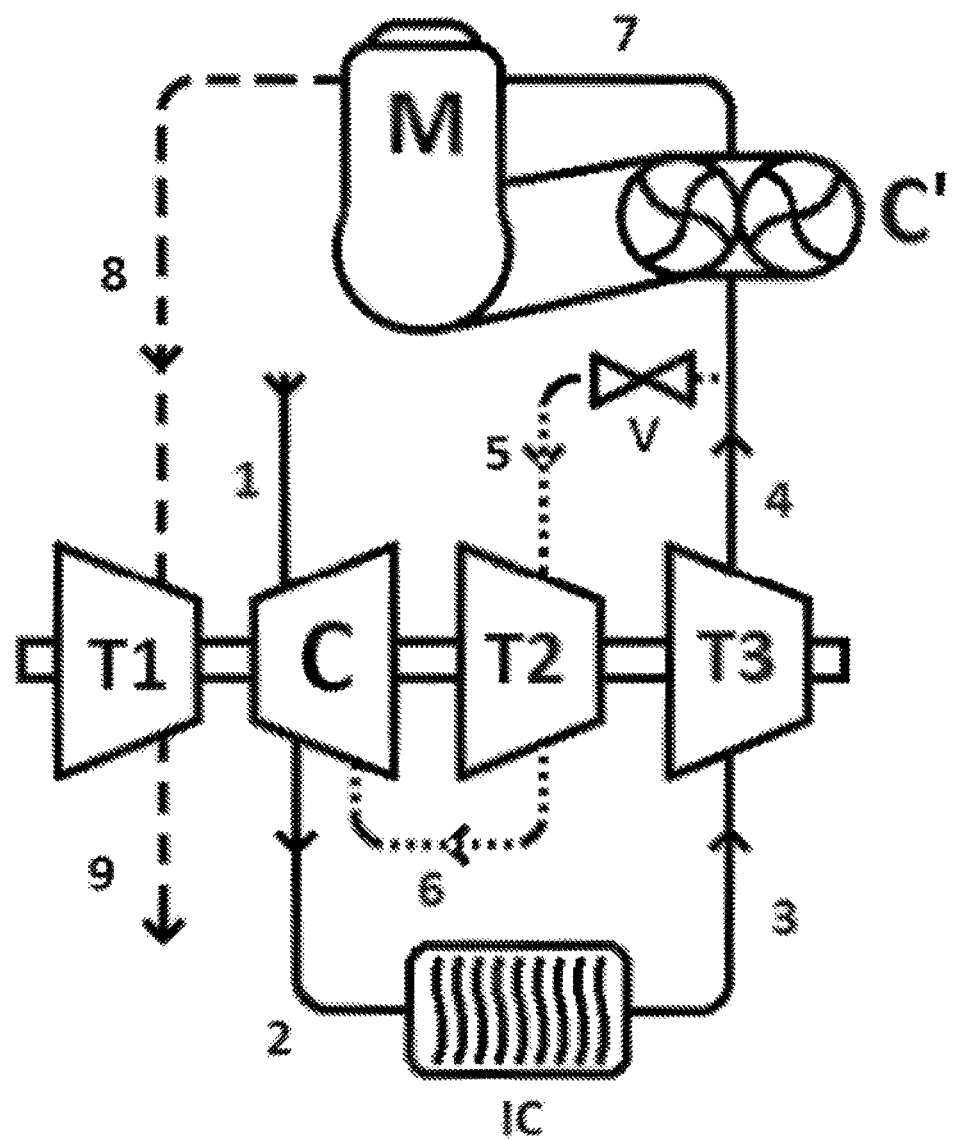

FIG. 6—Schematic view of the structural arrangement in a low-temperature turbocompressor for an internal combustion engine with an additional mechanical compressor.

Figure 7:
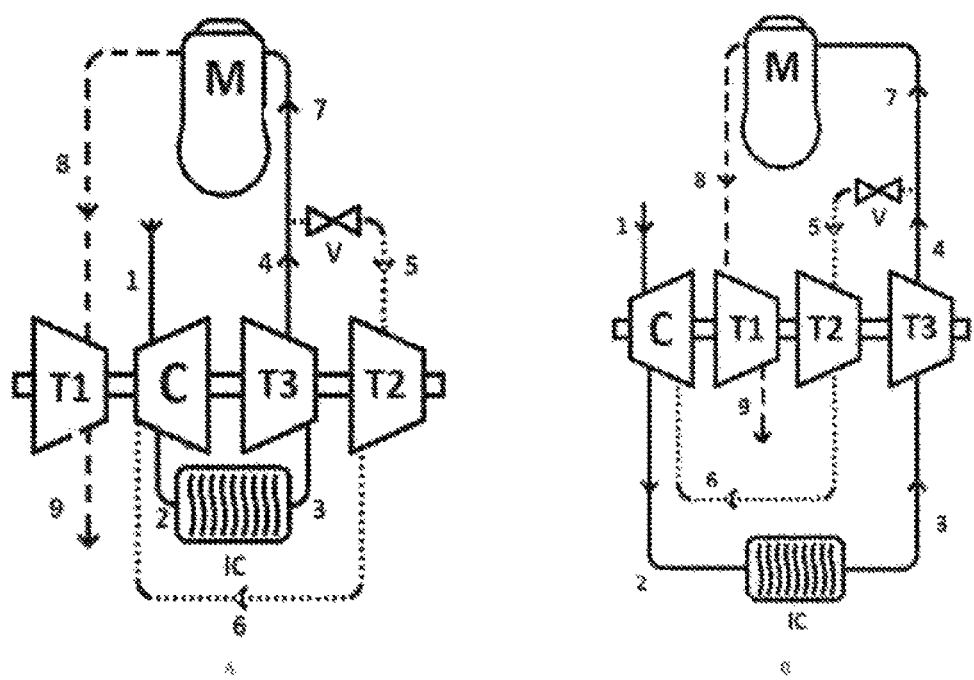

FIG. 7—Schematic view of alternative inversions of the sequence of the structural arrangement in a low-temperature turbocompressor for an internal combustion engine. (A) Inversion of the sequence between the return air and intake air turbines; (B) between the exhaust turbine and the compressor.

Figure 8:
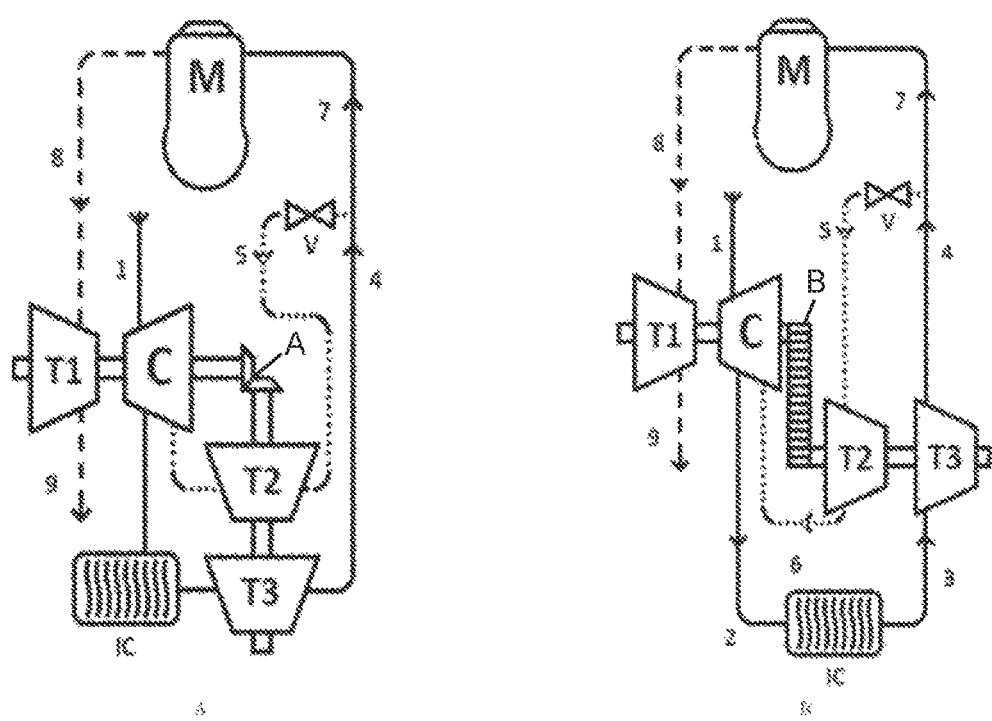

FIG. 8—Schematic view of alternative arrangements of the structural arrangement in a low-temperature turbocompressor for an internal combustion engine. (A) Assembly perpendicular to the cold turbines; (B) assembly parallel to the cold turbines.

Figure 9:
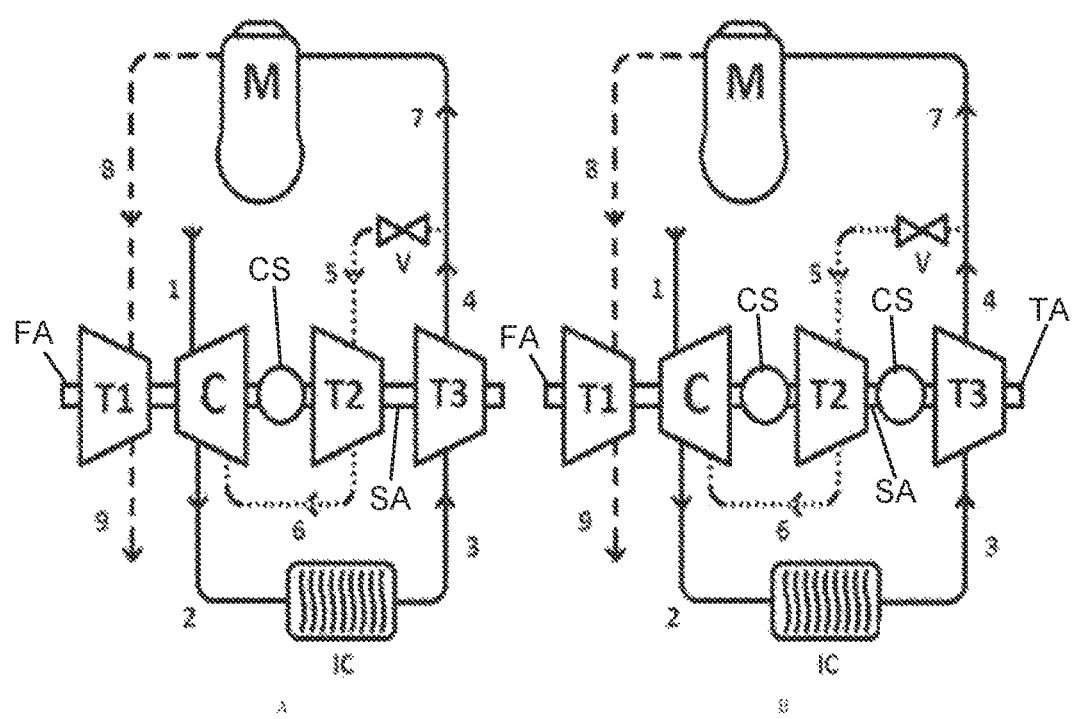

FIG. 9—Schematic view of the structural arrangement in a low-temperature turbocompressor for an internal combustion engine with a coupling/uncoupling system for the cold turbines. (A) dependent using a coupling system to connect the first axle to the second axle; (B) independent using a coupling system to connect the first axle to the second axle and another coupling system to connect the second axle to the third axle.

Unbroken line 1-7: intake pipe
Dotted line 5-6: Return pipe
Dashed line 8-9: Exhaust pipe
T1—Exhaust gas turbine
C—Compressor
T2—Return air turbine
T3—Intake air turbine
IC—Intercooler
IC'—Additional intercooler
V—Return valve
M—Engine
T'—Additional turbine
C'—Additional compressor
FA—First Axle
SA—Second Axle
TA—Third Axle

DESCRIPTION

In the structural arrangement in a low-temperature turbocompressor for an internal combustion engine (FIG. 1), the turbocompression system is formed by the exhaust gas turbine (T1) rigidly connected to the compressor (C). The compressor conveys the fluid to a cooler that can be an intercooler (IC), but that is not limited to this or other types of heat exchangers, nor to a specific coolant fluid, since any type of coolant fluid can used. Sequentially, the flow of cooled compressed air is conveyed to a second turbine, known as the intake air turbine (T3), the pressure of which is regulated by a return valve (V) that prevents the overloading of the engine (M), directing the excess flow to a third turbine, known as the return air turbine (T2), which returns the air to the inlet of the compressor (C). The two turbines T2 and T3 are rigidly connected to the compressor (C) and to the exhaust gas turbine (T1). The system can use compressors and turbines of variable geometry and any other compressors or turbines that can be installed on the same shaft, with any type of assembly constraining the movement thereof. The system can also include multiple stages with turbocompressors on separate shafts or on the same shaft as the former. The system proposed in the structural arrangement in a low-temperature turbocompressor for an internal combustion engine can also be used in conjunction with other air compressors, mechanical (FIG. 6) or otherwise, or even with additional turbocompressors, all in series (FIG. 5) or in parallel (FIGS. 2, 3 and 4) with the first. The system can also be used with compressors and turbines of variable geometry, with multiple stage expansion and/or compression. The engine can be a two- or four-stroke Otto-cycle or diesel engine. Additional heat exchangers can also be used, and any coolant fluid can be used.

FIG. 1 shows operation of the structural arrangement in a low-temperature turbocompressor for an internal combustion engine, in which the turbocompression system is formed by the exhaust gas turbine (T1), which uses the exhaust gases from the engine that are flowing through the exhaust pipe (dashed line) and is rigidly connected to the compressor (C). The temperature of the air in this compressor (C), which is arranged at the start of the intake pipe (unbroken line), is lowered by the intercooler cooling system (IC), after which the air is conveyed to the intake air turbine (T3), moved by the flow of intake air of the engine. The pressure is regulated by the return valve (V), which releases some of the compressed air to ensure that the pressure does not exceed the maximum pressure admitted by the engine (M). The air released by this valve is conveyed through the return pipe (dotted line) to the return air turbine (T2), which expands this mass of air from the working pressure of the engine to atmospheric pressure, resulting in a loss of heat. This air is conveyed to the inlet of the compressor (C) as part of the air that is compressed in the cycle, reducing the work done by the compressor on account of the low temperature thereof. The turbines moved by compressed air are constrained to move with the compressor (C) to generate more power and to enable the compressor (C) to produce even greater pressures. The cycle is therefore fed back by the work of the compressed-air turbines (the return air turbine (T2) and the intake air turbine (T3)) and by the lower effort required by the compressor (C) to compress the cooler air, tending to reach an equilibrium resulting from mechanical and thermal losses. Therefore, the objective of the structural arrangement in a low-temperature turbocompressor for an internal combustion engine is to cause the temperature of the intake air of the engine, at a given working pressure of the engine, to be significantly lower than the temperature reached in a normal system.

To achieve this purpose, other configurations of the structural arrangement in a low-temperature turbocompressor for an internal combustion engine are possible, as shown in FIGS. 2, 3, 4, 5, 6, 7 and 8. FIGS. 2 and 3 relate to the installation of an additional low-pressure turbocompressor in parallel with the turbocompressor formed by the exhaust gas turbine (T1) and the compressor (C). In these configurations, an additional turbine (T') installed in the exhaust pipe uses the exhaust gases from the engine after the exhaust gas turbine (T1) to drive a constrained additional compressor (C') installed in the intake pipe before the compressor (C), increasing air intake. In FIG. 3, the air coming from the additional compressor (C') is cooled by an additional intercooler (IC') before entering the compressor (C). FIG. 4 relates to the installation of an additional high-pressure turbocompressor in parallel with the turbocompressor formed by the exhaust gas turbine (T1) and the compressor (C). In this configuration, an additional turbine (T') installed in the exhaust pipe uses the exhaust gases from the engine before the exhaust gas turbine (T1) to drive a constrained additional compressor (C') installed in the intake pipe between the compressor (C) and the intercooler (IC), also to increase air intake. FIG. 5 relates to the installation of an additional high-pressure turbocompressor on the same shaft as the other turbocompressors. In this configuration, an additional turbine (T') installed in the exhaust pipe uses the exhaust gases from the engine after the exhaust gas turbine (T1) to drive an additional compressor (C') rigidly connected to the system, installed in the intake pipe before the compressor (C), also to increase air intake. FIG. 6 relates to the installation of an additional mechanical compressor (C') arranged in parallel with the turbocompressor formed by the exhaust gas turbine (T1) and the compressor (C). In this configuration, an additional constrained mechanical compressor (C') is installed on the intake pipe between the intake air turbine (T3) and the engine (M), also to increase air intake. FIGS. 7 and 8 show other possible configurations intended to take advantage of available spaces and/or conditions. FIG. 7A shows the installation of the intake air turbine (T3) between the compressor (C) and the return air turbine (T2), bringing the first turbine of the intercooler (IC) closer. FIG. 7B shows the option of placing the exhaust gas turbine (T1) in sequence with the return air turbine (T2) and intake air turbine (T3) positioned on the shaft after the compressor. FIG. 8 shows an example of the rotational transmission options from the return air turbine (T2) and intake air turbine (T3) to the compressor (C), perpendicularly using gears (A) or in parallel using a belt (B).

FIG. 9 explores the possibility of using a coupling system (CS) that enables the turbocompressor formed by the exhaust gas turbine (T1) and the compressor (C) to only connect to the system of the return air turbine (T2) and the intake air turbine (T3) when the turbines start generating power for the system. In configuration "A" in FIG. 9, the coupling occurs when the system of the return air turbine (T2) and the intake air turbine (T3) in conjunction begins generating power for the system, and configuration "B" in FIG. 9 provides the option of the return air turbine (T2) being coupled when the turbine starts generating power for the system, followed by coupling of the intake air turbine (T3) when the turbine reaches the required state.

"The low-temperature turbocompressor structural arrangement for an internal combustion engine" relates to a system for using the energy that is available but unused during operation of an internal combustion engine to cool the air supplied to the engine by supercharging, applicable to internal combustion engines of any type, characterized in that it supplies the engine with air that is colder and therefore denser than a common turbocompressor, and does so using the same amount of energy as consumed by this latter.

"The low-temperature turbocompressor structural arrangement for an internal combustion engine" relates to a system for using the energy that is available but unused during operation of an internal combustion engine to cool the air supplied to the engine by supercharging, applicable to internal combustion engines of any type, as described in 001, formed by a system comprising a turbocompressor and turbines and characterized in that the turbocompression system is formed by the exhaust gas turbine (T1) rigidly connected to the compressor (C), in which the compressor conveys the fluid to a fluid cooler that can be an intercooler (IC), but that is not limited to this or other types of heat exchanger, nor to a specific coolant fluid, since any type can be used, and sequentially, the flow of cooled compressed air is conveyed to an intake air turbine (T3) with pressure regulated by a return valve (V) that prevents the overloading of the engine (M) and directs the excess flow to a return air turbine (T2) that returns the air to the inlet of the compressor (C), in which the turbines T2 and T3 are rigidly connected to the compressor (C) and to the exhaust gas turbine (T1).

"The low-temperature turbocompressor structural arrangement for an internal combustion engine" relates to a system for using the energy that is available but unused during operation of an internal combustion engine to cool the air supplied to the engine by supercharging, applicable to internal combustion engines of any type, as described in 1 and 2, with alternative structures characterized in that the system can use compressors and turbines of variable geometry or any other compressors or turbines that can be installed on the same shaft, with any type of assembly constraining the movement thereof, include multiple stages with turbocompressors on separate shafts or on the same shaft as the first, be used in conjunction with other air compressors, mechanical (FIG. 6) or otherwise, or even with additional turbocompressors, all in series (FIG. 5) or in parallel (FIGS. 2, 3 and 4) with the former, use compressors and turbines of variable geometry, with multiple stage expansion and/or compression, in two- or four-stroke Otto-cycle or diesel engines, using additional heat exchangers and any coolant fluid, with the option of assembling fully or partially as required, in which each component part can be adapted to pre-existing systems.

"The low-temperature turbocompressor structural arrangement for an internal combustion engine" relates to a system for using the energy that is available but unused during operation of an internal combustion engine to cool the air supplied to the engine by supercharging, applicable to internal combustion engines of any type, as described in 1, 2 and 3, with connection of the turbocompressor to the system of cooled air turbines, characterized in that they occur, but not exclusively, from the moment at which the turbines begin generating power for the system, individually or in a group (FIG. 9).

CONCLUSION

Accordingly, the structural arrangement in a low-temperature turbocompressor for an internal combustion engine is based on novel functional and technical features, as can be seen from the attached figures and understood from the description, thereby qualifying for the claimed legal protection.

The invention claimed is:

1. A turbo compressor engine system comprising:
an internal combustion engine that includes an intake pipe and an exhaust manifold pipe;
a first turbine coupled to a first shaft, the first turbine configured to receive hot and pressured gases from the internal combustion engine and to discharge the gases to an ambient environment;
wherein the first turbine rotates about the first shaft;
a compressor coupled to the first shaft, wherein the compressor is configured to receive and compress an ambient intake air stream and output a compressed air stream;
an intercooler coupled to an output of the compressor;
wherein the intercooler is configured to receive the compressed air stream from the compressor and to discharge a cooled compressed air stream;
a second turbine coupled to the first shaft;
a third turbine coupled to the first shaft;
wherein the third turbine is configured to receive the cooled compressed air stream from the intercooler and to discharge an expanded cooled air stream to the engine;
a return and relief valve in fluidic communication with the expanded cooled air stream from the third turbine and the second turbine;
wherein the return and relief valve discharges and an excess expanded cooled air stream;
wherein the second turbine is configured to receive the excess expanded cooled air stream from the return and relief valve and discharge the excess expanded cool air stream to the compressor intake thereby closing the fluidic communication and sending air to the compressor at a lower temperature than the ambient air.

2. The turbo compressor of claim 1, wherein the engine uses diesel.

3. The turbo compressor of claim 1, that further includes an additional set of turbo compressors in one of a series and a parallel fluid communication, wherein this second set of turbo compressors enhance an engine's efficiency across a broader range of speeds.

4. The turbo compressor of claim 1, further including an additional set of turbo compressors one of connected to and disconnected from the first axle.

5. The turbo compressor of claim 1, wherein the power to run the compressor is derived from the first, second and third turbines.

6. A turbo compressor for an internal combustion engine having an air intake pipe and an exhaust pipe comprising:
a first exhaust gas turbine having a first intake in fluid communication with the exhaust pipe and a first discharge in fluid communication with an ambient environment;
wherein the first exhaust gas turbine is fixedly attached to a first axle and rotates the first axle in response to a supply of pressurized exhaust gas from the engine;
an intake air turbine having a second intake in fluid communication with the air intake pipe and having a second discharge in fluid communication with the internal combustion engine;
wherein the intake air turbine is fixedly attached to the first axle and rotates the first axle in response to a supply of air under pressure from an ambient environment;
a return air turbine having a third intake in fluid communication with the air intake pipe and a third discharge in fluid communication with a first compressor;
wherein the return air turbine is fixedly attached to the first axle and rotates the first axle in response to a supply of air under pressure from a return pipe; and
wherein the return pipe connects the third intake to the air intake pipe;
a valve installed in the return pipe for regulating a returning mass flow;
wherein the first compressor includes a fourth intake in fluid communication with the air intake pipe and a fifth intake in fluid communication with the third discharge;
wherein the fourth and fifth intakes are separated and united in the first compressor;
wherein the first compressor is fixedly attached to the first axle and rotates in response to the rotation of the first axle in order to supply pressurized air from the air intake pipe and the return air turbine to the internal combustion engine; and
wherein the first compressor further includes a fourth discharge in fluid communication with an intercooler;
wherein the fourth discharge combines the air from the intake pipe and the air from the return air turbine; and
wherein the intercooler includes a sixth intake in fluid communication with the fourth discharge and a fifth discharge; and
wherein the intercooler includes a heat exchange surface between the sixth intake and the fifth discharge;
wherein a temperature of air in the sixth intake is higher than a temperature of air at the fifth discharge; and
wherein the fifth discharge is in fluid communication with the second intake.

7. The turbo compressor of claim 6, further comprises a second compressor having a seventh intake and a sixth discharge installed in fluid communication with the first compressor and a second exhaust gas turbine having a eighth intake and a seventh discharge installed in fluid communication with the first exhaust gas turbine.

8. The turbo compressor of claim 7, wherein the second compressor is mounted to the first axle and rotates in response to the rotation of the first axle in order to provide a supply of pressurized air from the air intake pipe.

9. The turbo compressor of claim 7, wherein the second exhaust turbine is mounted to the first axle and rotates the first axle in response to a supply of pressurized air from the exhaust pipe.

10. The turbo compressor of claim 7, further comprising a second axle supporting the second compressor and the second exhaust turbine for rotation thereabout.

11. The turbo compressor of claim 7, further comprising a second intercooler having a ninth intake and an eighth discharge, the second intercooler is positioned between the first compressor and the second compressor and is in fluid communication therewith.

12. The turbo compressor of claim 6, further comprising a third axle supporting one or more turbines and/or compressors.

13. The turbo compressor of claim 12, wherein the third axle is connected to the first axle by gears or belts.

14. The turbo compressor of claim 6, further comprising a mechanical compressor positioned in fluid communication with the internal combustion engine.

15. A power supply system for vehicles comprising:
an internal combustion engine having an air intake pipe and an exhaust pipe; and
a turbo compressor having an air intake pipe and an exhaust pipe, and further comprising:
  a first exhaust gas turbine having a first intake in fluid communication with the exhaust pipe and a first discharge in fluid communication with an ambient environment;
    wherein the first exhaust gas turbine is fixedly attached to a first axle and rotates the first axle in response to a supply of pressurized exhaust gas from the engine;
  an intake air turbine having a second intake in fluid communication with the air intake pipe and having a second discharge in fluid communication with the internal combustion engine;
    wherein the intake air turbine is fixedly attached to the first axle and rotates the first axle in response to a supply of air under pressure from an ambient environment;
  a return air turbine having a third intake in fluid communication with the air intake pipe and a third discharge in fluid communication with a first compressor;
    wherein the return air turbine is fixedly attached to the first axle and rotates the first axle in response to a supply of air under pressure from a return pipe; and
    wherein the return pipe connects the third intake to the air intake pipe;
  a valve installed in the return pipe for regulating a returning mass flow;

wherein the first compressor includes a fourth intake in fluid communication with the air intake pipe and a fifth intake in fluid communication with the third discharge;
    wherein the fourth and fifth intakes are separated and united in the first compressor;
  wherein the first compressor is fixedly attached to the first axle and rotates in response to the rotation of the first axle in order to supply pressurized air from the air intake pipe and the return air turbine to the system; and
  wherein the first compressor further includes a fourth discharge in fluid communication with an intercooler;
    wherein the fourth discharge combines the air from the intake pipe and the air from the return air turbine; and
    wherein the intercooler includes a sixth intake in fluid communication with the fourth discharge and a fifth discharge; and
    wherein the intercooler includes a heat exchange surface between the sixth intake and the fifth discharge;
    wherein a temperature of air in the sixth intake is higher than a temperature of air at the fifth discharge; and
    wherein the fifth discharge is in fluid communication with the second intake.

16. The power supply system of claim 15, further comprises a second compressor having a seventh intake and a sixth discharge installed in fluid communication with the first compressor and a second exhaust gas turbine having a eighth intake and a seventh discharge installed in fluid communication with the first exhaust gas turbine.

17. The power supply system of claim 16, wherein the second compressor is mounted to the first axle and rotates in response to the rotation of the first axle in order to provide a supply of pressurized air from the air intake pipe.

18. The power supply system of claim 16, wherein the second exhaust turbine is mounted to the first axle and rotates the first axle in response to a supply of pressurized air from the exhaust pipe.

19. The power supply system of claim 16, further comprising a second axle supporting the second compressor and the second exhaust turbine for rotation thereabout.

20. The power supply system of claim 16, further comprising a second intercooler having a ninth intake and an eighth discharge, the second intercooler is positioned between the first compressor and the second compressor and is in fluid communication therewith.

21. The power supply system of claim 15, further comprising a third axle supporting one or more turbines and/or compressors.

22. The power supply system of claim 21, wherein the third axle is connected to the first axle by gears or belts.

23. The power supply system of claim 15, further comprising a mechanical compressor positioned in fluid communication with the internal combustion engine.

\* \* \* \* \*

UNITED STATES PATENT AND TRADEMARK OFFICE
CERTIFICATE OF CORRECTION

PATENT NO. : 11,268,435 B2
APPLICATION NO. : 16/762797
DATED : March 8, 2022
INVENTOR(S) : Natal De Avila Antonini et al.

It is certified that error appears in the above-identified patent and that said Letters Patent is hereby corrected as shown below:

In the Claims

In Claim 1, at Column 7, Line 32, delete "an exhaust manifold pipe" and insert --an exhaust pipe--

In Claim 1, at Column 7, Line 55, delete "discharges and an" and insert --discharges an--

In Claim 1, at Column 7, Line 56, after "excess expanded cooled air stream;" insert --and--

Signed and Sealed this
Twenty-sixth Day of April, 2022

Katherine Kelly Vidal
*Director of the United States Patent and Trademark Office*